Patented Nov. 18, 1952

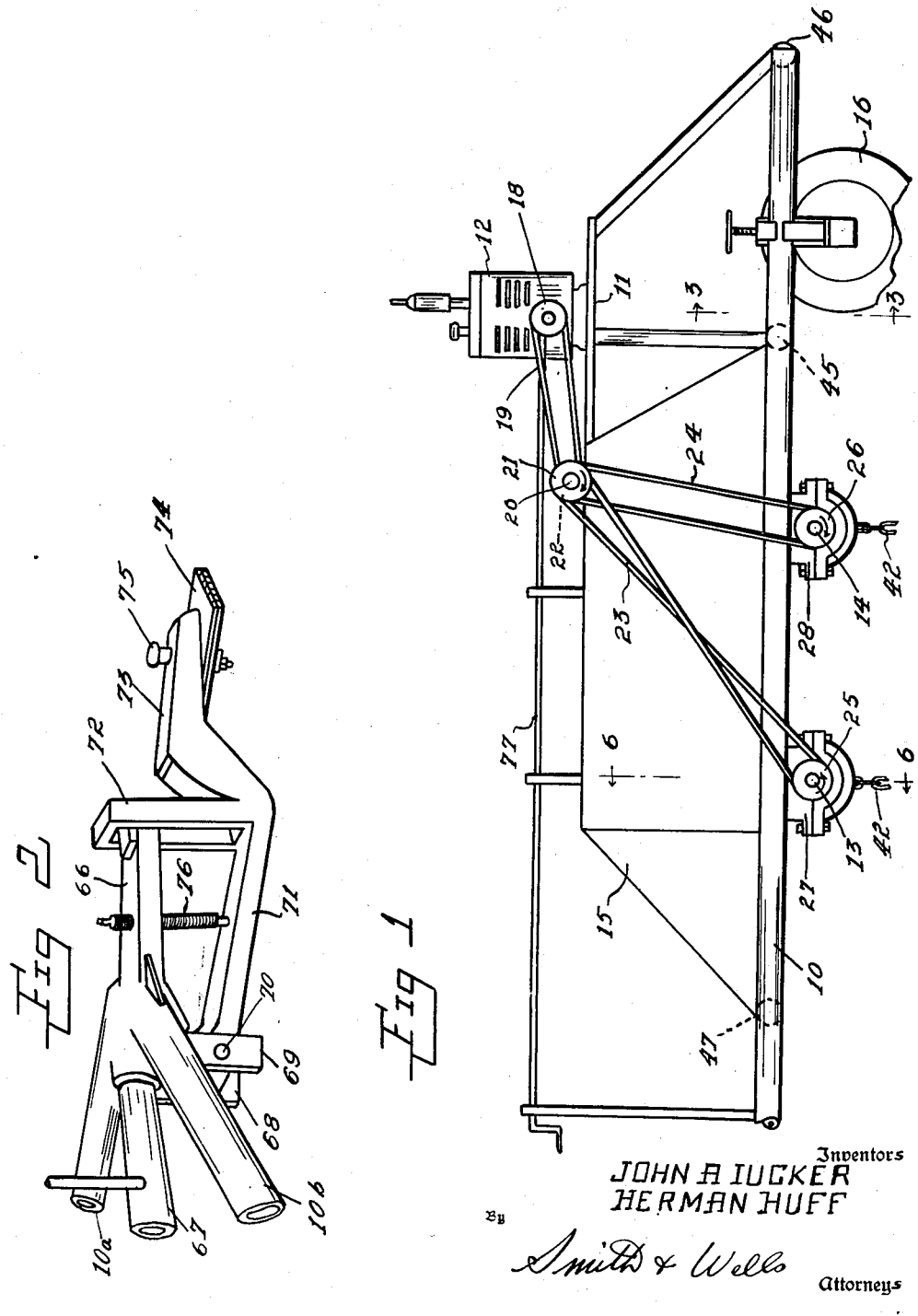

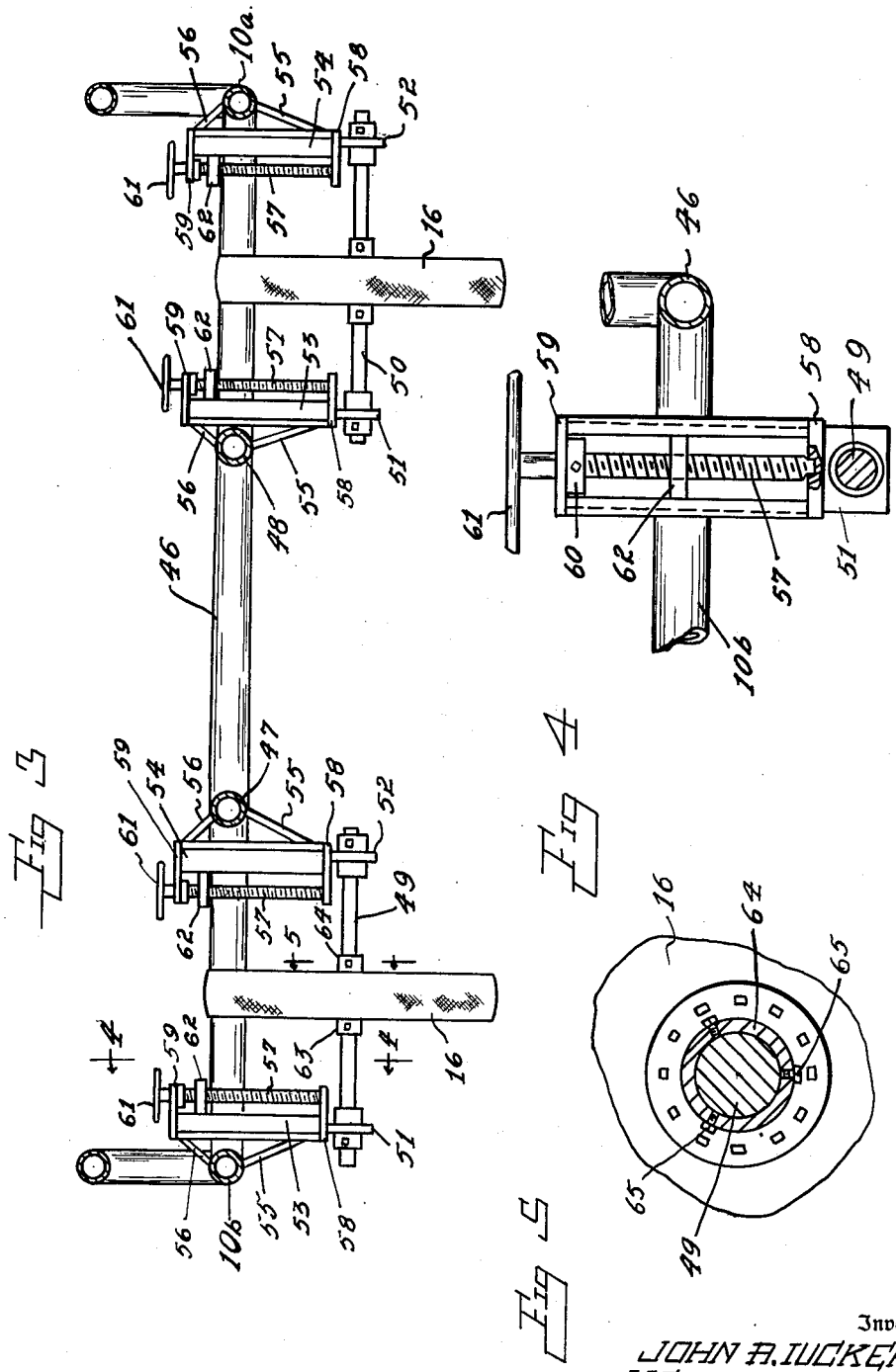

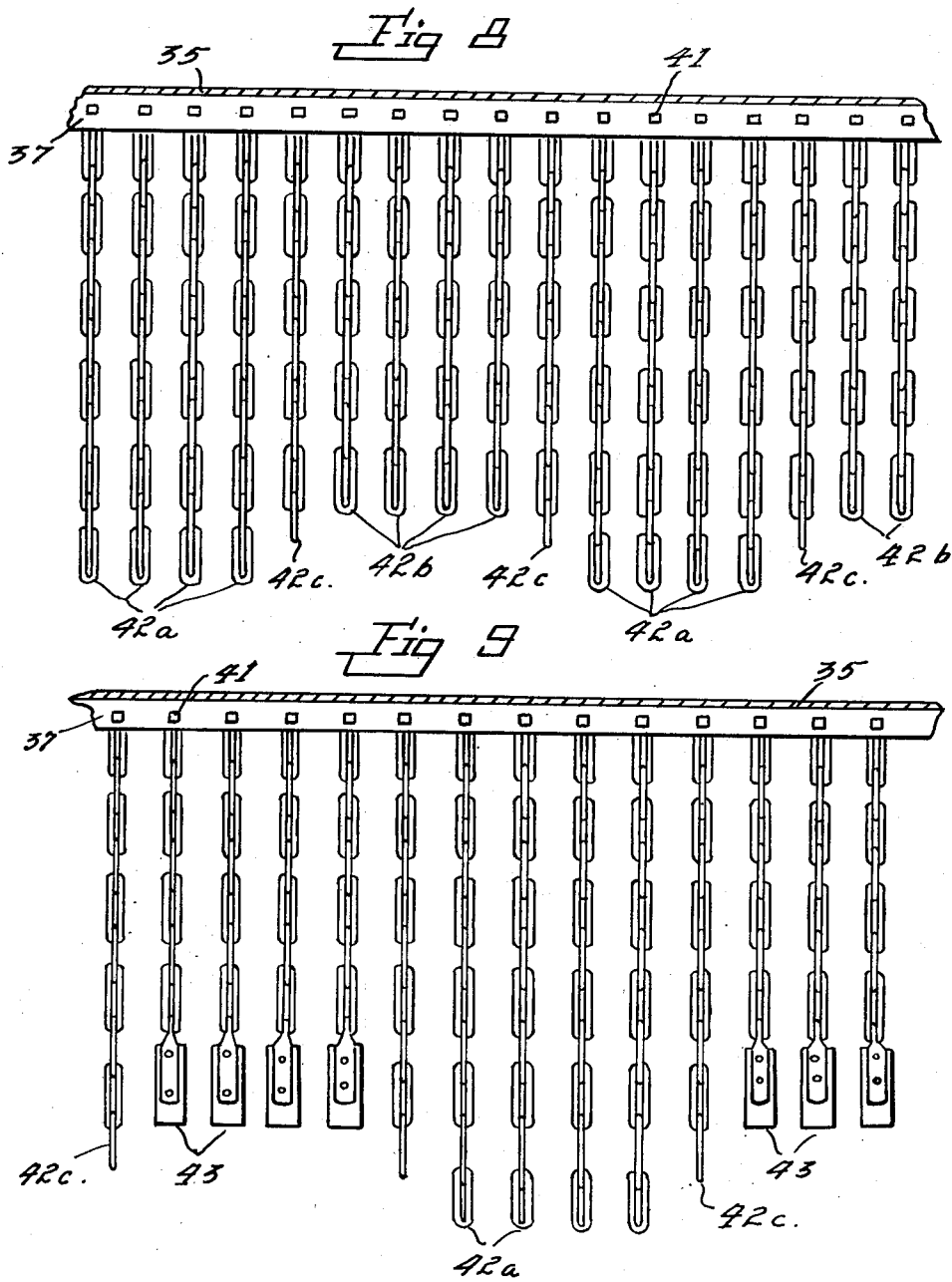

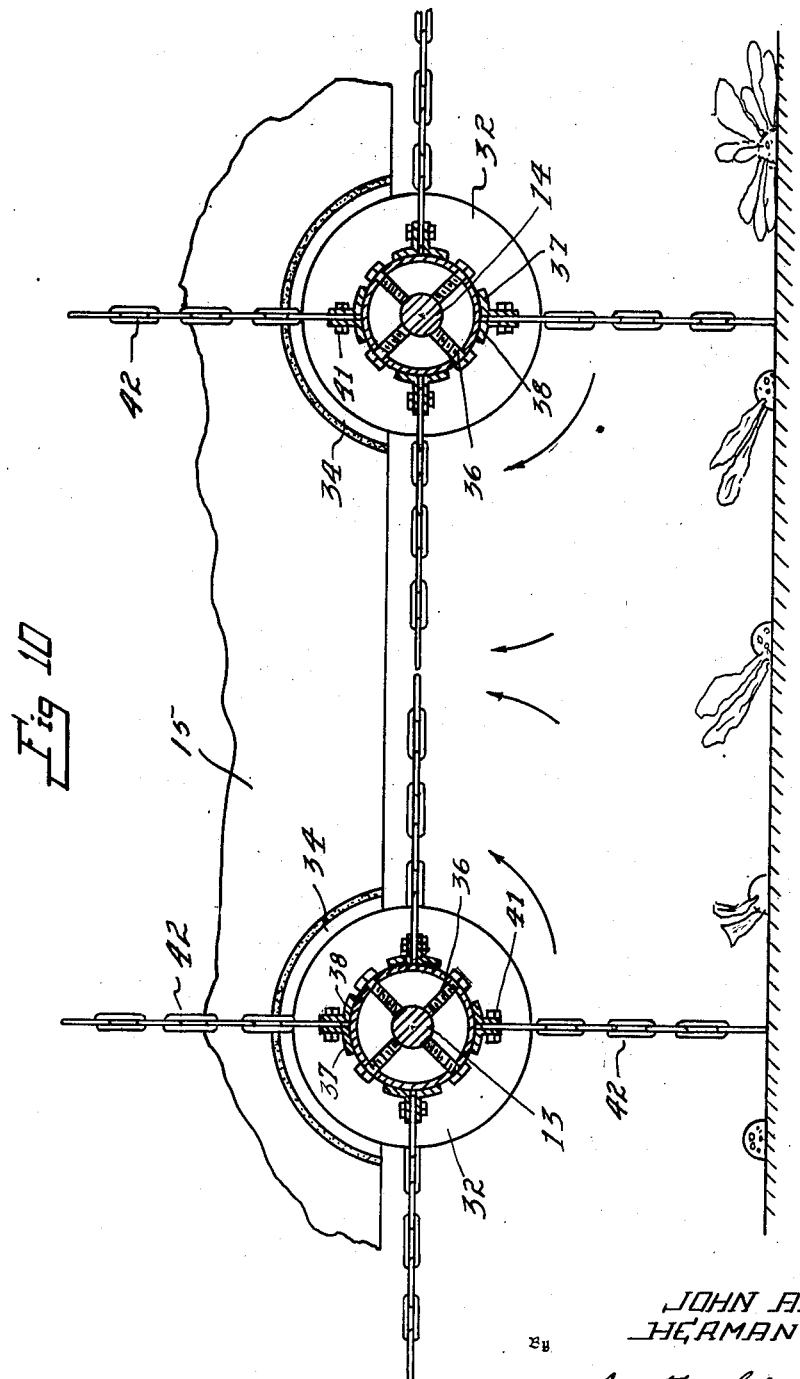

2,618,112

UNITED STATES PATENT OFFICE 2,618,112

FOLIAGE REMOVING MACHINE

John A. Iucker and Herman Huff, Nampa, Idaho; said Iucker assignor to said Huff

Application February 20, 1947, Serial No. 729,804

5 Claims. (Cl. 55—61)

Our invention relates to improvements in a foliage removing machine.

Our invention is embodied in a machine which is particularly adapted for removing the tops from such crops as sugar beets and the like. In harvesting such crops the foliage must be removed either before or after the crops are dug. The machine, although particularly adapted for beet tops, may also be used for other root crops such as potatoes, carrots, turnips and the like.

It is the principal purpose of the invention to provide a machine of this character, which in one passage across the field, will remove the foliage from the root crop so that the crop may be dug and harvested without further manual labor in removing the bulky foliage. Modern agricultural methods utilize machines for digging and elevating such crops to a vehicle, such as a truck. By first removing the foliage and leaving it on the field a great amount of time and labor is saved. The foliage is also left on the soil in a broken up condition where it aids in maintaining the fertility of the soil by forming a mulch which eventually decays to add humus to the soil.

Most of the crops, such as are referred to above, are planted in rows and in cultivating and irrigating the crops it is customary to form shallow ditches between the rows and to more or less hill the soil along the rows. Our invention contemplates a machine which may readily be set for accommodating the foliage removal to such hill and valley ground surfaces and to accommodate the machine to various widths of rows.

It is also the purpose of our invention to provide in a machine of this character a novel arrangement of foliage removing beaters whereby the foliage is alternately driven in opposite directions, and a current of air is caused to flow upwardly so as to tend to lift the foliage between the alternate striking thereof by the beaters in order to effectively break the foliage free of the roots.

It is a further purpose of our invention to provide a novel beater construction whereby the actual beater elements are arranged to effect adequate contact with the foliage under all conditions of ground surfaces encountered.

The novel features that we consider characteristic of our invention are set forth with particularity in the claims. The invention itself, however, both as to its organization and its method of operation, together with additional objects and advantages thereof, will be understood from the following description of a preferred form of the invention which is also illustrated in the accompanying drawings.

In the drawings:

Figure 1 is a view in side elevation of a machine embodying our invention;

Figure 2 is a perspective view of a tractor hitch employed in the machine;

Figure 3 is a fragmentary sectional enlarged view taken substantially on the line 3—3 of Figure 1;

Figure 4 is a sectional enlarged view taken on the line 4—4 of Figure 3;

Figure 5 is a fragmentary sectional enlarged view taken on the line 5—5 of Figure 3;

Figure 8 is a detailed enlarged view illustrating the construction and arrangement of the beater elements employed;

Figure 9 is a view like Figure 8, further illustrating the construction of the beater elements, and Figure 10 is a somewhat diagrammatic view illustrating the relative positions of adjacent beater units and the direction of rotation thereof.

Figure 6:
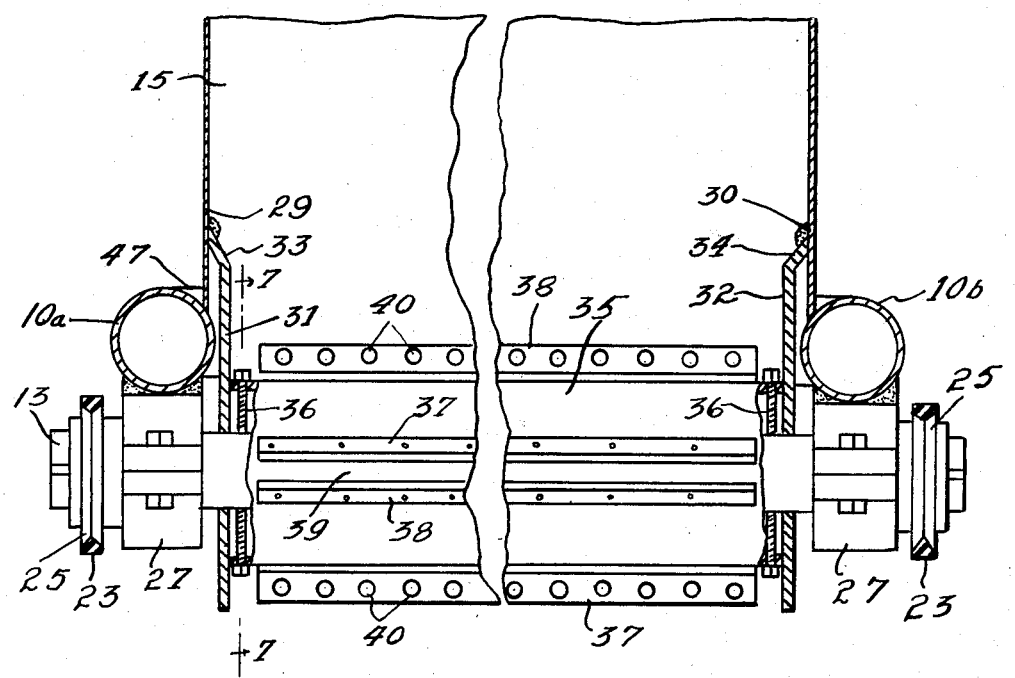
Figure 6 is a sectional enlarged view taken on the line 6—6 of Figure 1 with parts removed.

In foliage removing machines such as beet toppers it is essential that foliage be removed thoroughly. Various devices have been made for this purpose, some of which employ brushes and others of which utilize a disk like arrangement for engaging the foliage. We are aware, however, of no machine of this character which is capable of fully removing the foliage in a single trip along a row of beets.

While our invention in certain aspects is not limited to the use of oppositely rotating pairs of beater units, we prefer such a construction for the purpose of obtaining complete removal of the foliage in a single trip over the crop.

According to our invention we provide a frame work 10 preferably of metal tubing which carries a superstructure 11 on which an engine 12 is mounted. The frame work mounts two beater shafts 13 and 14 which operate beneath a housing 15 that is carried by the frame work 10. The frame work 10 is supported at its rear end by wheels 16 and preferably is provided at its forward end with a tractor hitch 17 that is shown more in detail in Figure 2 of the drawings. The engine 12 has a drive pulley which is connected by a belt 19 to a power shaft 20 that is mounted on the superstructure 10 on suitable bearings (not shown). The shaft 20 carries pulleys 21 and 22 which are in turn connected by belts 23 and 24 to pulleys 25 and 26 on the beater shafts 13 and 14. The belt 23 is crossed as indicated so as to drive the beater shaft 13 in the opposite direction to the rotation of the shaft 20. The directions of rotation of the several shafts 13, 14 and 20 are indicated by arrows on the pulleys 21, 25 and 26. The shafts 13 and 14 are mounted to the frame work 10 by suitable bearings shown at 27 and 28.

Figure 7:
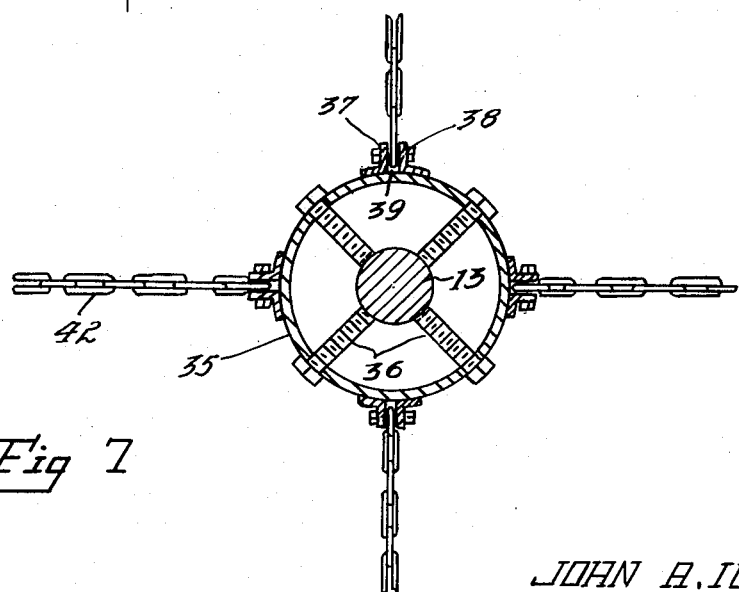
Figure 7 is a sectional enlarged view taken on the line 7—7 of Figure 6.

Figures 6 and 7 illustrate the detailed construction by means of which the shafts 13 and 14 mount suitable beaters for engaging the crop foliage. The construction shown indicates the mounting of the shaft 13 and the arrangement of the beaters thereon. The same construction is utilized for the shaft 14. The housing 15 has side portions 29 and 30 which are secured to the tubing 10a and 10b forming the side rails of the frame work 10. The housing portions also carry guard rings 31 and 32 which are apertured to receive the shafts 13 and 14 which are flanged as indicated at 33 and 34, the flanges being welded to the side portions 29 and 30 of the housing. Between the guard rings 31 and 32 the shaft carries a beater supporting cylinder 35. This cylinder is positioned on the shaft by a series of bolts 36 at each end of the cylinder and at intermediate points along the cylinder where the cylinder is long and needs additional support. The machine is made in various widths to accommodate one or more rows of crops as desired. For a multiple row machine it is, of course, necessary that the frame 10 be wider and that the cylinders 35 be longer. The bolts 36 are threaded in the cylinder 35 and bear against the shaft 13 in the manner best illustrated in Figure 7 of the drawings.

Each cylinder carries four pairs of beater mounting bars 37 and 38. These bars preferably are angle irons welded to the cylinder 35 so as to provide a space between adjacent angle irons as indicated at 39. The outwardly extended flanges of the angle irons have apertures 40 at spaced intervals throughout the length thereof so that bolts 31 may be utilized to mount rows of beaters 42 on the cylinder.

The beaters 42 may be of any suitable material such as flexible strands that will be extended by centrifugal force when the shafts 13 and 14 are rotated at high speed. Figures 8 and 9 of the drawings illustrate certain forms of beaters that have been found to be particularly effective. The beaters shown in Figures 8 and 9 are chains some of which are provided with paddles 43 on their free ends. Figure 8 illustrates the arrangement of the beater chains 42 on opposite pairs of the angle irons 37 and 38. Figure 9 illustrates the arrangement of beater chains on the other pairs of angle irons. The arrangement is such that certain groups of chains 42, such as those indicated at 42a in Figures 8 and 9, are longer than other chains 42b and longer than the paddle carrying chains. It is preferred also to have intermediate beater chains 42c which are longer than the chains 42b but shorter than the chains 42a. The beaters 42b carried by the shaft 13 are aligned lengthwise of the machine with the like beaters 42b on the shaft 14. This is done in order to create a hill and valley arrangement such that the roots of the crop will be directly under the chains 42b and the chains carrying the paddles 43. Thus, the foliage that droops at the sides of the rows will be engaged by the longer chains 42c and 42a. The number of beater chains and the length thereof are varied to adapt the machine to different row spacing and different types of foliage. For example: A foliage that spreads more widely like potato vines will require a greater number of the chains 42b than a foliage such as carrot tops would require.

Referring now to the Figures 3, 4 and 5, these figures illustrate the mounting of the machine on the wheels 16. The frame work 10, in addition to the side rails 10a and 10b has cross rails such as 45 and 46, the several rails being welded together. There are also two additional tubes 47 and 48 extending rearwardly from the cross rail 45 to the cross rail 46. Axles 49 and 50 have the wheels 16 journaled thereon and these axles are adjustably mounted for vertical movement with respect to the frame work 10, by securing each axle at its opposite ends by bars 51 and 52. The bars slide vertically in guides 53 and 54 which are supported on the tubes 10a, 47, 48 and 10b. All of these guides are alike in construction and are secured to their respective tubes by plates 55 and 56 welded thereto and welded to the tubes. Each guide has journaled therein an adjusting screw 57, the lower end of the screw being set into a plate 58 at the bottom of the guide and the upper end of the adjusting screw being secured beneath a top plate 59 of the guide by a collar 60. Hand wheels 61 are provided on the adjusting screw so that they may be rotated in the guide. The bars such as 51 and 52 have threaded blocks 62 welded thereon at the top and these blocks are threaded to receive the threads of the screw 57. By means of the screw 57 the bars 51 and 52 can be moved up and down in the guides to raise and lower the frame work 10 with respect to the wheels 16.

The wheels 16 are also adjustable lengthwise of the axles 49 and 50 to accommodate their spacing to different row conditions encountered. This is accomplished by mounting the wheel bearings between two collars 63 and 64 which are secured by set screws 65 on the axles 49 and 50. This makes it possible to adapt the machine before using it in any particular field to the exact row spacing utilized in planting that field in order that the wheels 16 will travel along the valleys or ditches between the crop rows.

The tractor hitch shown in Figure 2 is also so constructed that the frame work 10 may be raised or lowered with respect to the tractor. The hitch includes a bar 66 which is joined integrally to the forward ends of the side rails 10a and 10b, which are extended forwardly and inwardly from the housing 15. A third frame member 67 is welded to the cross frame member 47 and the members 10a, 10b and 67 are welded together and to the bar 66. Bars 68 and 69 are welded to the rails 10a and 10b and extended downwardly. A pivot pin 70 is mounted in the lower ends of the bars and serves to pivot a coupling member 71. The coupling member includes an upwardly extending slotted block 72 in which the forward end of the bar 66 is guided. The coupling is provided with an extension 73 which sets upon the draw bar 74 of the tractor and is pivoted thereto by a pivot pin 75.

The bar 66 carries a screw 76 spaced forwardly a substantial distance from the pivot point at 70 of the coupling member 71. This screw bears on the coupling member and it will be appreciated that by adjusting the screw the angular position of the bar 66 with respect to the coupling member may be changed to effect a vertical adjustment of the front end of the machine with respect to the draw bar 74.

The speed at which the shafts 13 and 14 should be driven is rather high. We find that a speed of about 800 R. P. M. is adequate. The drive mechanism preferably utilizes connections from both ends of the shaft 20 to the shafts 13 and 14. The shafts 13 and 14 are provided with pulleys 25 and 26 at both ends and the pulley and belt arrangement shown in Figure 1 is duplicated on the other side of the machine. In order to control the beaters a clutch rod 77 is extended from a clutch 78 on the engine shaft, to the forward end of the machine where it can be operated by the driver of the tractor used to pull the machine. The beaters on the shaft 13 are, at the time of striking the foliage, moving toward the rear end of the machine. At the same time the beaters on the shaft 14 are moving toward the front of the machine when they strike the foliage. This arrangement of the high speed beaters produces the novel effect of lifting the foliage between the beaters by creating an up draft of air between the shafts 13 and 14. Note that the beaters in Figure 10 of the drawings reach almost to contact with each other as they pass upwardly between the shafts. This action of the two sets of beaters, rotating at high speed, insures clean removal of the foliage, and substantial disintegration thereof.

Since the power means for the beaters is independent of the tractor that pulls the machines, the speed of the beaters is maintained whether the tractor is going slow or fast.

The beaters 42 and the paddles 43 used on the ends of some of the beaters may be made of any suitable material. For example, the paddles may be made of a rubber and fabric strip such as is used for belting.

Our invention and its use are believed to be shown by the foregoing description and the accompanying drawings, in sufficient detail to enable anyone skilled in this art to make use of the invention.

Having thus described our invention, we claim:

1. A machine for removing foliage from root crops such as beets, carrots, potatoes, etc., which comprises a supporting vehicle including a frame and supporting wheels therefor, a pair of spaced apart beater shafts mounted for rotation on said frame, said spaced apart shafts lying at right angles to the longitudinal axis of said frame, said longitudinal axis coinciding with the direction of travel of said frame, flexible beaters mounted on the shafts, and power means for rotating said shafts at high speed in such directions that the beaters travel upward between the shafts.

2. A machine for removing foliage from root crops such as beets, carrots, potatoes, etc., which comprises a supporting vehicle including a frame and supporting wheels therefor, a pair of spaced apart beater shafts mounted for rotation on said frame, said spaced apart shafts lying at right angles to the longitudinal axis of said frame, said longitudinal axis coinciding with the direction of travel of said frame, flexible beaters mounted on the shafts, and power means for rotating said shafts at high speed in such directions that the beaters travel upward between the shafts, said beaters comprising spaced alternate groups of long and short flexible beater strips on each shaft.

3. A machine for removing foliage from root crops such as beets, carrots, potatoes, etc., which comprises a supporting vehicle including a frame and supporting wheels therefor, a pair of spaced apart beater shafts mounted for rotation on said frame, said spaced apart shafts lying at right angles to the longitudinal axis of said frame, said longitudinal axis coinciding with the direction of travel of said frame, circumferentially spaced rows of flexible beaters mounted on said shafts, means to rotate the forward shaft in the same direction as the wheels turn as the vehicle travels and means to rotate the rear shaft in the opposite direction whereby the beaters on the shafts create an updraft of air between the shafts tending to lift the foliage.

4. A foliage removing machine comprising a supporting vehicle including a frame and supporting wheels therefor, a pair of closely spaced beaters mounted for rotation on axes extending transversely of the frame, means to rotate the forward beater in the same direction as the supporting wheels turn as the vehicle travels and means to rotate the rearward beater in the opposite direction whereby the beaters create an updraft of air between them tending to lift the foliage between the beaters.

5. A foliage removing machine comprising a supporting vehicle including a frame and supporting wheels therefor, a pair of closely spaced beaters mounted for rotation on axes extending transversely of the frame, means to rotate the forward beater in the same direction as the supporting wheels turn as the vehicle travels, means to rotate the rearward beater in the opposite direction whereby the beaters create an updraft of air between them tending to lift the foliage between the beaters, and a housing on the frame covering both beaters for directing the air endwise of the frame above the beaters.

JOHN A. IUCKER.
HERMAN HUFF.

REFERENCES CITED

The following references are of record in the file of this patent:

UNITED STATES PATENTS

| Number | Name | Date |
| --- | --- | --- |
| 318,865 | Burgess et al. | May 26, 1885 |
| 373,370 | Johnson | Nov. 15, 1887 |
| 951,678 | Davis et al. | Mar. 8, 1910 |
| 1,035,056 | Shubert et al. | Aug. 6, 1912 |
| 1,169,793 | Fulbright | Feb. 1, 1916 |
| 1,257,343 | Harper | Feb. 26, 1918 |
| 1,263,965 | Twitchel | Apr. 23, 1918 |
| 1,505,572 | McDonald | Aug. 19, 1924 |
| 1,542,963 | Russell | June 23, 1925 |
| 1,628,101 | Baldwin | May 10, 1927 |
| 1,870,932 | Sternmann | Aug. 9, 1932 |
| 2,341,486 | Swertfeger | Feb. 8, 1944 |
| 2,354,112 | Garst | July 18, 1944 |
| 2,505,089 | Bailey | Apr. 25, 1950 |